United States Patent Office 3,406,397
Patented Oct. 15, 1968

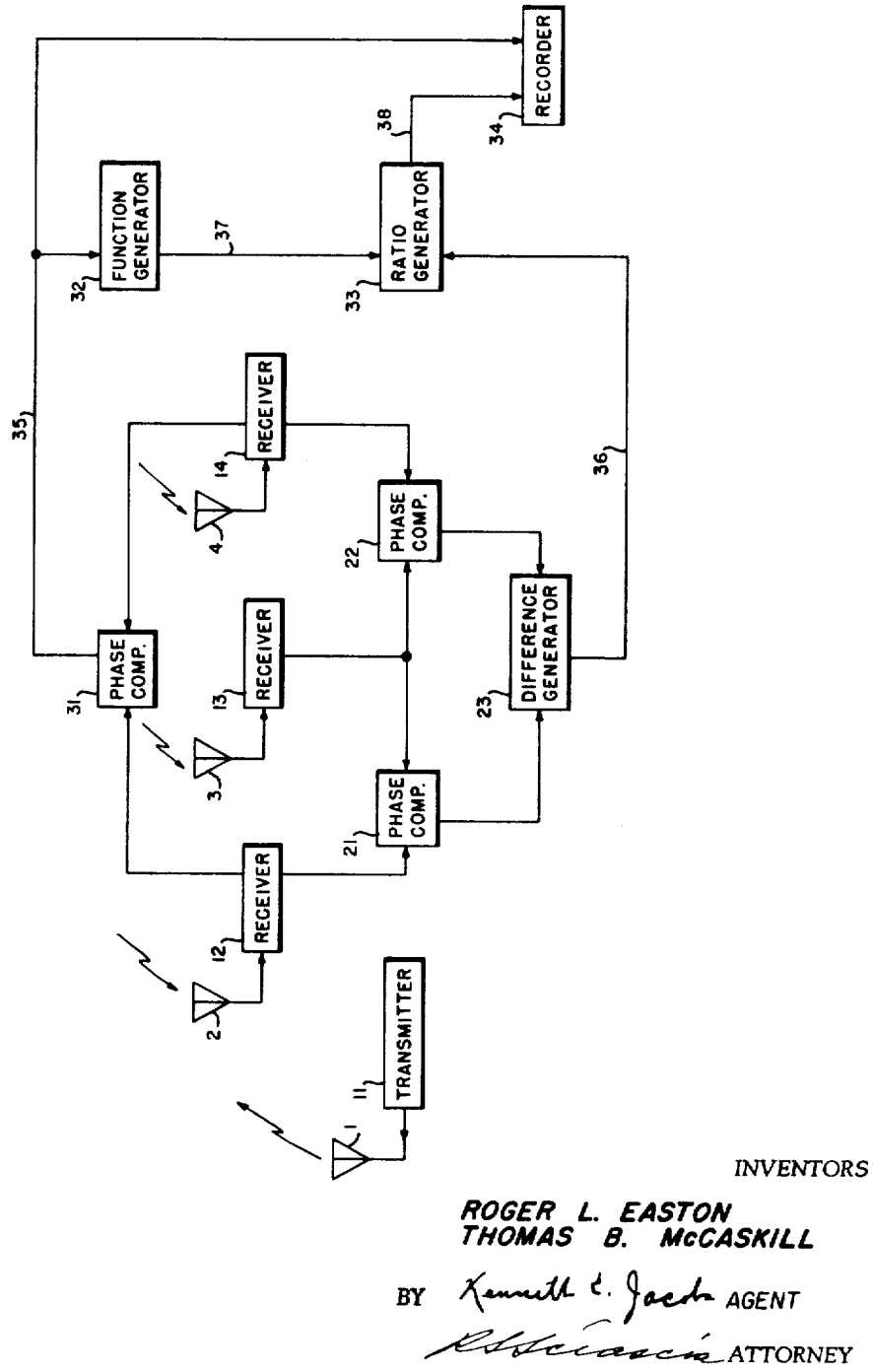

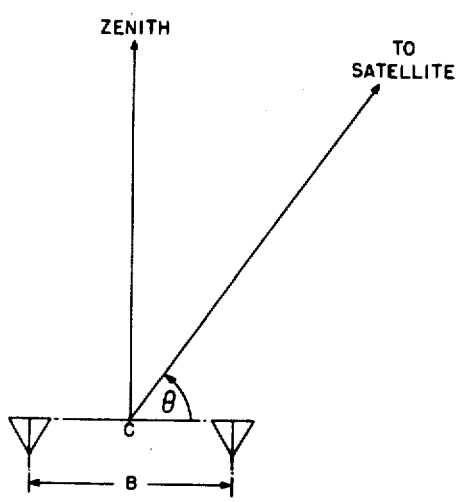
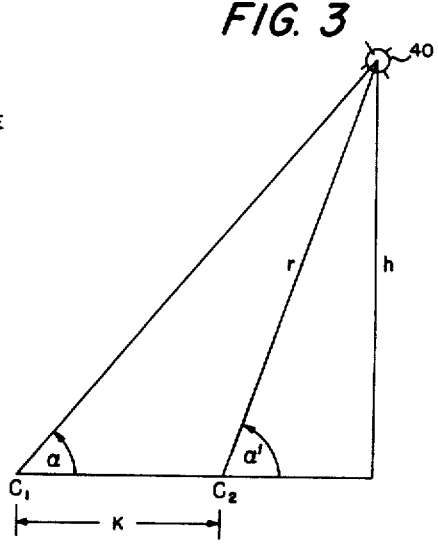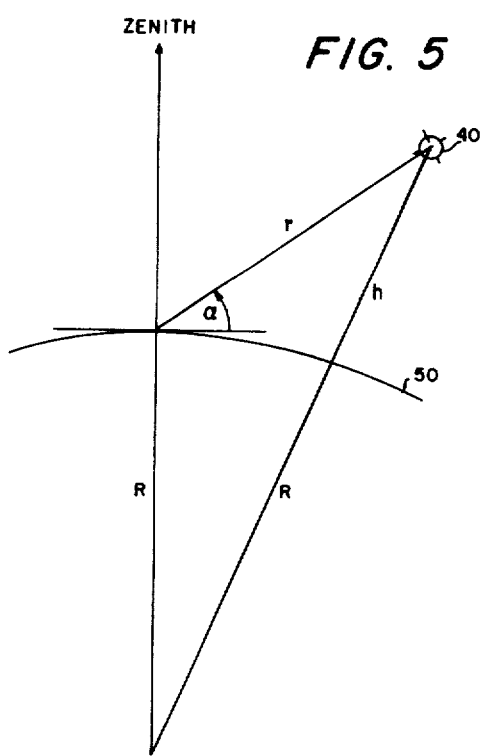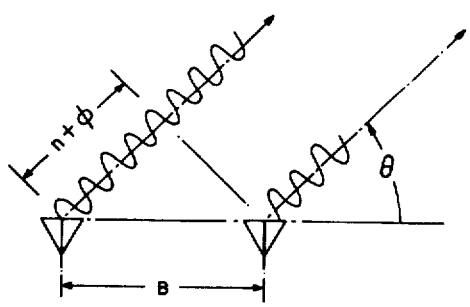

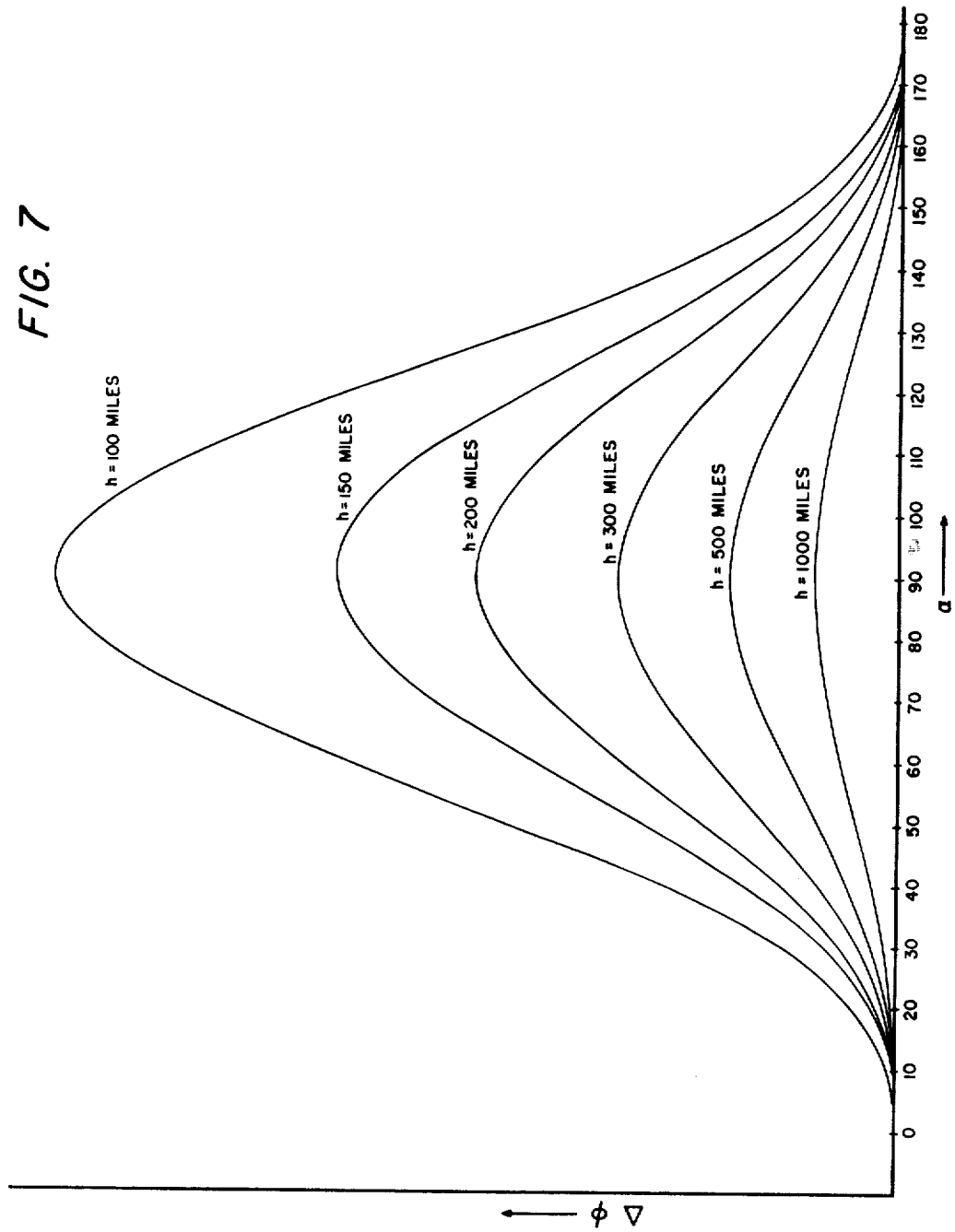

3,406,397
SATELLITE ANGLE AND ALTITUDE
MEASURING SYSTEM
Roger L. Easton, Washington, D.C., and Thomas B. McCaskill, Alexandria, Va., assignors to the United States of America as represented by the Secretary of the Navy
Filed July 21, 1967, Ser. No. 655,246
8 Claims. (Cl. 343—15)

ABSTRACT OF THE DISCLOSURE

A radio interferometer system for determining from a single receiver site the angle and latitude of a satellite. A transmitted fan-shape beam forms a fence through which the satellite passes and echo signals are detected by pairs of receivers. The phase difference between the signals received at a receiver pair is directly related to the angle of arrival of the signals while the difference between the phase differences obtained from two pairs of receivers is related to both arrival angle and satellite altitude. Additional pairs of receivers are used to eliminate measurement ambiguities.

The invention described herein may be manufactured or used by or for governmental purposes without the payment of any royalty thereon.

Background of the invention

The present invention relates to an artificial earth satellite observation system and more particularly to a surveillance system capable of measuring both satellite altitude and angle.

U.S. Patent No. 3,122,741 issued Feb. 25, 1964, to R. L. Easton discloses a satellite detection system for determining the direction of reflecting objects by using interferometer techniques. In order to determine the altitude of the satellite as well as its direction at least two receiver sites were required for simultaneous angle measurements so that triangulation methods could be used to calculate the desired result. This requirement of plural receiving sites to receive from a given satellite obviously increases the costs and complexity of the system. Not only is the equipment more or less duplicated at each site but a reliable communications link between the sites is required.

Summary of the invention

The general purpose of this invention is to provide a surveillance system which embraces all the advantages of the prior art systems and possesses none of the aforedescribed disadvantages. The present invention makes it possible to obtain altitude measurements from the same antenna pairs which are used for angle measurements. A transmitter sends out a continuous wave (C.W.) of radio energy in a fan-shaped pattern to form a substantially planar fence through which the expected satellites will pass. The receivers have similar antenna patterns and all are coplanar with the transmitter pattern so that when a satellite enters the transmitting antenna pattern it is also entering the antenna patterns of the receiving antennas.

The technique for measuring the angular positions of a satellite works on the principle of comparing the path length from the satellite to one receiving antenna with the path length from the same satellite to a second receiving antenna. This comparison is made by determining the phase difference between the signals arriving at the two antennas. Actually, the phase measuring apparatus can measure only a difference in degrees that is an amount less than a whole wavelength. The number of whole wavelengths is ambiguous and a system of differently spaced pairs of antennas is required to uniquely determine how many whole wavelengths are involved. The most accurate satellite angle measurements can be obtained by choosing these antenna pairs so that the center of each pair is located at a common station center. This invention permits altitude measurements by choosing antenna pairs whose centers are offset from station center and then determining the difference between the phase differences measured for each pair. This difference is related to both the satellite's altitude and angle, and by dividing the value obtained into an amount which is a function of the measured angle, it is possible to derive the satellite altitude. Plural pairs of antenna pairs with different offsets are used to eliminate whole wavelength ambiguities.

The same antennas used to determine satellite angle are also used to determine altitude but for the pairing is carried out in a different way. For measuring angle the pairs are chosen to have different spacings while the pair centers are all located at station center. For the measurement which is a dependent on both altitude and angle the pairs are chosen to have different amounts of offset from station center. This latter measurement is inversely proportional to satellite altitude and directly proportional to a fixed function of satellite angle. The altitude is obtained by dividing this measurement into a quantity which varies with the angle in accordance with a predetermined function.

An object of the present invention is the provision of a detection system for determining the altitude of an object from a single receiver site.

Another object is to provide a space surveillance station using radio interferometer techniques to determine both the altitude and zenith angle of a satellite.

A further object of the invention is the provision of a plurality of pairs of antennas for measuring the altitude of a satellite by determining the difference between phase differences of signals received at different pairs of antennas.

Still another object is to provide a system wherein the receiving antennas used in an angle determining interferometer system are also used to furnish phase signals which are compared to determine the altitude of the detected object.

Yet another object of the present invention is the provision of a system for transmitting a continuous wave of radio energy in a fan-shaped planar pattern for detecting objects passing through the plane of the pattern and determining their angles and altitudes from a single receiver site.

Brief description of the drawing

FIG. 1 shows a simplified diagram of a system according to the present invention;
FIGS. 2 through 5 show geometric diagrams to illustrate the relationships between the satellite and the receiving antennas;
FIG. 7 presents curves showing how the measured phase difference varies as a function of the satellite angle.

Description of the preferred embodiments

Figure 6:
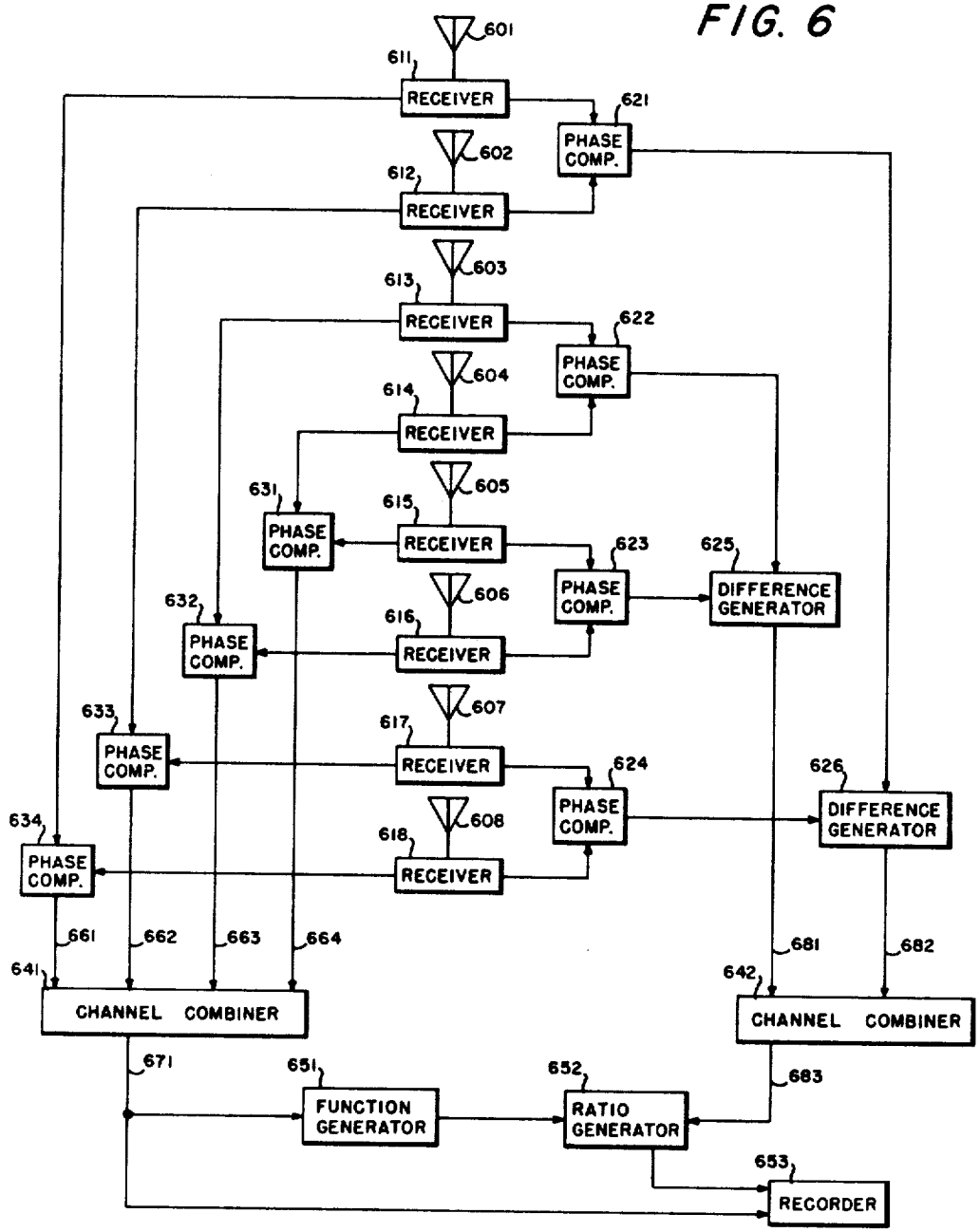
FIG. 6 shows a diagram of a system according to the invention including an arrangement for resolving phase ambiguities.

FIG. 1 shows one version of a satellite detection station. The transmitting antenna 1 transmits a fan-shaped pattern which acts as a fence through which satellites pass. The receiving antennas 2, 3, 4 are arranged to have fan-shaped reception patterns which more or less coincide with the transmitting pattern. In this way the region of detection is confined approximately to a plane and only objects passing through this plane are detected. FIGS. 2 and 4 depict one antenna pair with the associated geometry which yield the equation $$\cos \theta = \frac{n+\phi}{B}$$

where $n$ is an integer, $\phi$ is the phase measured by the system, $B$ is the antenna separation expressed in wavelengths for the system frequency and $\theta$ is the angle as measured at the center C of the antenna pair. In the system of FIG. 1 this phase measurement $\phi$ would be obtained from phase comparator 31 on line 35 and could recorded in recorder 34. As pointed out in the above cited patent the value of $n$ can be uniquely determined by using plural pairs of differently spaced antennas and combining the phase measurements from the various pairs. U.S. Patent No. 3,125,756 issued Mar. 17, 1964, to M. G. Kaufman and L. O. Hayden discloses such a system with an arrangement for carrying out the combining operation. U.S. Patent No. 3,307,193 issued Feb. 28, 1967 to M. G. Kaufman shows another system for combining the phase signals.

The present invention extends the prior systems by using the phase measurements from a single receiver site to determine satellite altitude in addition to the satellite direction. By comparing the differences between phase differences obtained from two pairs of antennas offset from each other it is possible to derive a signal which is related to both the altitude and angle of the satellite. This signal in conjunction with the angle measurement can be used to determine the satellite's altitude. FIG. 1 shows a simple system for doing this by first comparing the phase signals obtained from antennas 2 and 3 as well as antennas 3 and 4, and then obtaining on line 36 a signal which corresponds to the difference between these phase differences.

FIGS. 2 through 5 will help make clear how the various signals are related. FIG. 2 illustrates two antennas separated by a distance $B$ with the center point between the antennas located at C. FIG. 4 shows these antennas and illustrates how the phase of the signal received at one antenna differs from the phase at the other antenna by an amount $(n+\phi)$. FIG. 3 shows the position of satellite 40 with respect to the center points $C_1$ and $C_2$ of two pairs of antennas not shown in the figure. FIG. 5 shows the position of the satellite with respect to the earth 50.

For two pairs of antennas the measured phase differences would be:

(1) $\qquad (\phi_1 - \phi_2) = (n+\phi)_1 = B \cos \alpha$ (2) $\qquad (\phi_3 - \phi_4) = (n+\phi)_2 = B' \cos \alpha'$ with difference between the differences being (3) $\qquad \Delta\phi = B \cos \alpha - B' \cos \alpha'$ where the angles $\alpha$ and $\alpha'$ are shown in FIG. 3 to be measured at the center points of the antenna pairs.

From FIG. 3 it can be seen that angles $\alpha$ and $\alpha'$ are related by (4) $\qquad \alpha' = \alpha + \arcsin\left[\dfrac{K \sin \alpha}{r}\right]$ Referring to FIG. 5 it can be seen that the altitude $h$ is related to the slant range $r$ by the expression (5) $\qquad r = -R \sin \alpha + \sqrt{R^2 \sin^2 \alpha + 2Rh + h^2}$ For the case where $B = B'$ (i.e. where the baseline lengths of the antenna pairs are equal) the resulting difference in phase differences is (6)
$$\Delta\phi = B \left[\cos \alpha - \cos\left[\alpha + \arcsin \frac{K \sin \alpha}{-R \sin \alpha + \sqrt{R^2 \sin^2 \alpha + 2RH + h^2}}\right.\right.$$

A computer analysis of Equation 6 shows that the equation may be approximated by (7) $\qquad \Delta\phi = \dfrac{KBf(\alpha)}{h}$ where $f(\alpha)$ may be computed from Equation 6. Therefore (8) $\qquad h = \dfrac{KBf(\alpha)}{\Delta\phi}$ It has been found that $f(\alpha)$ is approximately $\sin^3 \alpha$. With K, B, and $f(\alpha)$ known it is possible to determine $h$ by measuring $\alpha$ and $\Delta\phi$. In FIG. 1 signals proportional to $\alpha$ and $\Delta\phi$ are generated on lines 35 and 36 respectively, and function generator 32 transforms the $\alpha$ measurement to a value corresponding to $f(\alpha)$. Finally ratio generator 33 divides the signal on line 37 by the signal on line 36 to generate a signal proportional to altitude $h$ on line 38. Both the angle and altitude determinations may be recorded on recorder 34 if desired.

FIG. 6 shows a more complete system according to the invention with an arrangement to eliminate whole wavelength ambiguities. Antennas 601–608 are taken in pairs with various baseline lengths to develope signals on lines 661–664 that correspond to the angle of the satellite. As explained in the above mention U.S. Patent No. 3,125,756 the signals derived from the pair having the greatest baselength give the maximum angle resolution since this resolution is directly proportional to the length of the baseline. However, this output is a multivalued function of the angle of arrival except in the special case where the baseline is less than one-half wavelength. The wavelength referred to is that associated with the frequency of the radio signals involved. The correct direction angle may be determined by employing a system of pairs of antennas starting with a pair separated by less than ½ wavelength apart. Coupling effects between closely spaced antennas can be avoided by using two pairs of antennas with long baselines which differ by approximately ½ wavelength.

Four pairs of antennas are shown in FIG. 6 and, of course, even more could be used. The phase difference signals obtained on lines 661–664 are combined in channel combiner 641 to produce a signal on line 671 corresponding to the angle of arrival of the signal from the satellite. The above mentioned U.S. Patent Nos. 3,125,756 and 3,307,193 show channel combiners which could be used.

The antenna pairs used in in determining satellite angle are chosen so that they have various baselengths B but their centers C have negligible offsets, K, from each other. However, in order to determine satellite altitude, antenna pairs are chosen whose centers are offset from each other. It can be seen from Equation 7 that the measured difference between phase differences varies with KB, and by choosing various of KB it is possible to eliminate whole wavelength ambiguities arising in the altitude determination. Thus, the center point C of antennas 601 and 602 may be offset from the center of antenna 607 and 608 by an amount $K_1$ while antenna pair 603–604 is offset from pair 605–606 by a different amount $K_2$. As can be seen from Equation 7 the signals on lines 681 and 682 will depend on the particular values of K and B chosen and these signals can be combined in channel combiner 642 in a manner similar to that used in combiner 641. At combiner 641 the inputs differ by the factor B while at combiner 642 the factor is KB.

The remainder of the system in FIG. 6 functions in the same way as the corresponding portion of FIG. 1. The signal on line 671 is multiplied in function generator 651 by a predetermined factor which varies with the angle of the satellite and the resulting signal is divided by the signal on line 683 to produce a signal corresponding to the satellite altitude.

FIG. 7 shows how $\Delta\phi$ in Equation 7 varies with the satellite angle $\alpha$ when B and K are constant. Each curve on the graph corresponds to a given satellite altitude with altitudes from 100 miles to 1000 miles shown. It can be seen that $f(\alpha)$ is sufficiently fixed so that if $\alpha$ and $\Delta\phi$ are known, the satellite altitude can be determined.

In conclusion, therefore, there has been disclosed a system for determining both satellite angle and altitude from a single receiver site. Obviously many modifications and variations of the present invention are possible in light of the above teachings. It is therefore to be understood that within the scope of the appended claims, the invention may be practised otherwise than as specifically described.

What is claimed and desired to be secured by Letters Patent of the United States is:

1. In a radio interferometer system for determining the angle of arrival of the received signals and the altitude of an object being detected, the combination comprising:
   at least three receiving antennas;
   first phase comparator means connected to a first pair of said antennas to produce a first phase signal corresponding to the difference in phase between the signals received at said first pair of antennas;
   second phase comparator means connected to a second pair of said antennas to produce a second phase signal corresponding to the difference in phase between the signals received at said second pair of antennas;
   a difference means for receiving the first and second phase signals from said phase comparators to produce a difference signal corresponding to the difference between said first and second phase signals;
   third phase comparator means connected to a third pair of said antennas to produce a third phase signal corresponding to the difference in phase between the signals received at said third pair of antennas;
   a function generator for receiving said third phase signal to generate a fourth signal which is a non-linear function of said third phase signal; and
   ratio means to receive said fourth signal and said difference signal to produce an output signal which corresponds to the ratio of said fourth signal to said difference signal.

2. The combination of claim 1 including a transmitter for transmitting a substantially planar fan-shaped radio beam through which the objects to be detected will pass.

3. The combination of claim 1 wherein the antennas which make up said third pair of antennas are chosen from the antennas which make up said first and said second pairs of antennas.

4. The combination of claim 1 wherein one of said first pair of antennas is also one of the antennas in said second pair of antennas.

5. The combination of claim 1 wherein the baseline length between said first pair of antennas is different from the baseline length between said second pair of antennas.

6. In a radio interferometer system for determining the angle of arrival of the received signals and the altitude of an object being detected, the combination comprising:
   a plurality of receiving antennas;
   a first plurality of phase comparators, each comparator being connected to a different pair of said receiving antennas to produce a phase signal corresponding to the difference in phase between the signals received at said pair of antennas;
   a plurality of difference generators, each generator being connected to a different pair of said phase comparators to produce a difference signal corresponding to the difference between the phase signals produced by said pair of phase comparators; and
   a first channel combiner connected to said difference detectors to combine said difference signals to produce a first combined signal which is a function of the altitude and angle of the object being detected.

7. The combination of claim 6 including:
   a second plurality of phase comparators, each comparator being connected to a different pair of said receiving antennas to produce a phase signal corresponding to the difference in phase between the signals received at said pair of antennas;
   a second channel combiner connected to the outputs of said second plurality of phase comparators to combine said phase signals to produce a second combined signal which corresponds to the angle of arrival of the received signals;
   a function generator for receiving said second combined signal to generate a third combined signal which is a non-linear function of said second combined signal; and
   ratio means to receive said third combined signal and said first combined signal to produce an output signal which corresponds to the ratio of said third combined signal and said first combined signal.

8. The combination of claim 7 including a transmitter for transmitting a substantially planar fan-shaped radio beam through which the objects to be detected will pass.

References Cited

UNITED STATES PATENTS 3,122,741   2/1964   Easton _____ 343—15

RODNEY D. BENNETT, *Primary Examiner.*

R. E. BERGER, *Assistant Examiner.*